(12) United States Patent
Okada et al.

(10) Patent No.: US 7,018,288 B2
(45) Date of Patent: Mar. 28, 2006

(54) REGISTER FOR AIR CONDITIONING

(75) Inventors: Makoto Okada, Aichi-ken (JP); Mitsuo Ogura, Aichi-ken (JP); Kenji Asano, Aichi (JP); Junichiro Kako, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/889,045

(22) Filed: Jul. 13, 2004

(65) Prior Publication Data
US 2005/0042982 A1    Feb. 24, 2005

(30) Foreign Application Priority Data
Aug. 6, 2003    (JP) .............................. 2003-288226

(51) Int. Cl.
*B60H 1/34*    (2006.01)
(52) U.S. Cl. ....................... 454/155; 454/318; 454/322
(58) Field of Classification Search ................ 454/155, 454/313, 315, 318, 319, 320, 322, 325, 327
See application file for complete search history.

(56) References Cited

U.S. PATENT DOCUMENTS

| | | | |
|---|---|---|---|
| 5,591,079 A * | 1/1997 | Saida ......................... | 454/155 |
| 6,340,328 B1 * | 1/2002 | Schwandt et al. .......... | 454/155 |
| 6,652,371 B1 * | 11/2003 | Kamio ....................... | 454/155 |
| 2003/0050001 A1 * | 3/2003 | Kamio ....................... | 454/155 |
| 2003/0157880 A1 * | 8/2003 | Nishida et al. ............. | 454/155 |
| 2004/0203334 A1 * | 10/2004 | Shibata et al. .............. | 454/155 |

FOREIGN PATENT DOCUMENTS

| JP | A-11-139156 | 5/1999 |
|---|---|---|
| JP | A-11-180140 | 7/1999 |

* cited by examiner

*Primary Examiner*—Harold Joyce
(74) *Attorney, Agent, or Firm*—Posz Law Group, PLC

(57) ABSTRACT

An air-conditioning register includes a cylinder-shaped retainer having opposite inner surfaces, a fin assembly including a plurality of fin members disposed in the retainer, a first connector connecting the fin members, a second connector, and a guide guiding the second connector on a predetermined track. The fin members includes paired fin members disposed in proximity to the opposite inner surfaces of the retainer, at least one of the paired fin members swinging by a swing angle smaller than that of all of the other fin members, and functioning as a dummy fin member keeping a constant angle independently within a predetermined swing-angle range where all of the other fin members swing. The second connector connects the dummy fin member and all of the other fin members while absorbing a swing-angle difference between the dummy fin member and all of the other fin members.

9 Claims, 6 Drawing Sheets

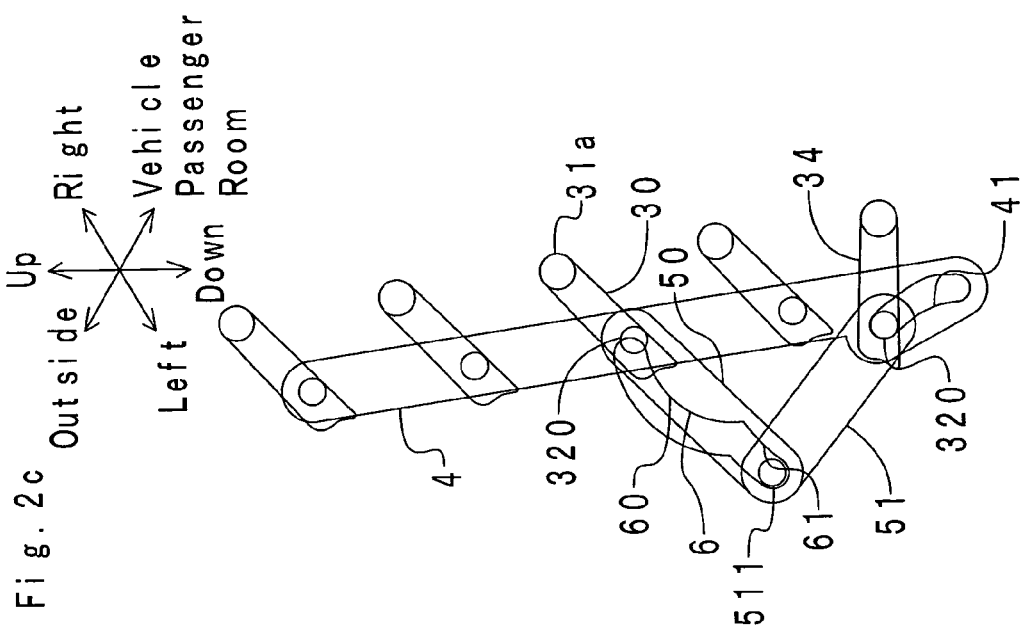
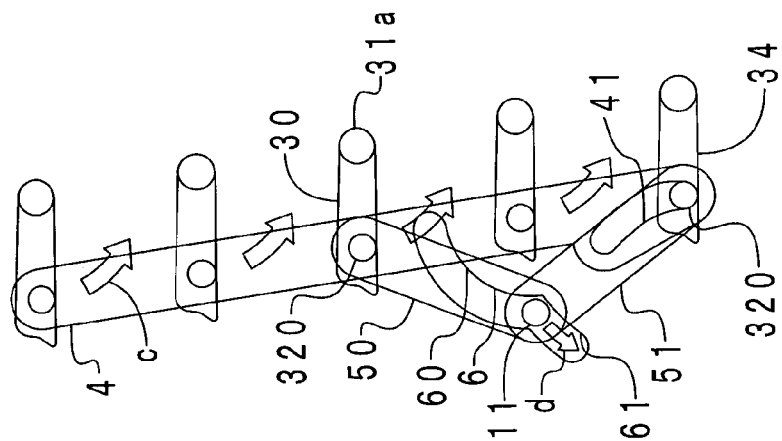
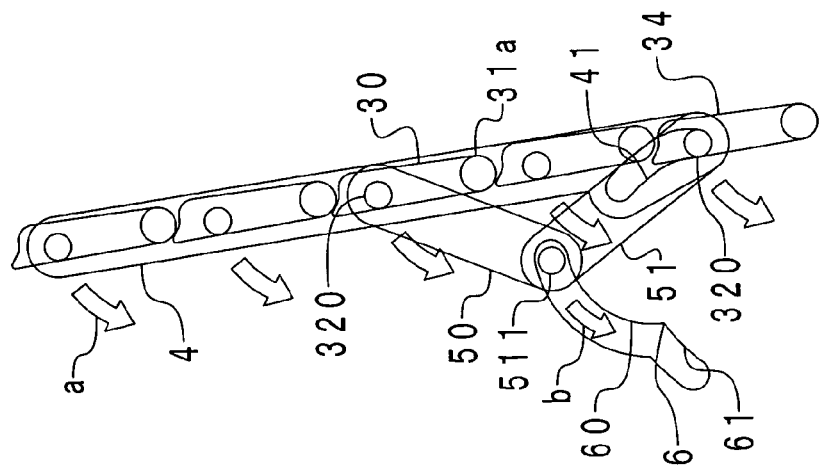

REGISTER FOR AIR CONDITIONING

BACKGROUND OF THE INVENTION

1. Field of the Invention

The present invention relates to a register for supplying air-conditioning air into vehicle passenger rooms, for example.

2. Description of the Related Art

FIG. 6 illustrates a drawing of a link mechanism for a conventional register for air conditioning. The conventional air-conditioning register 100 comprises a retainer 101, a horizontal fin assembly 102, and a connecting rod 103. The retainer 101 comprises an outlet port 104 facing inwardly a vehicle passenger room. The horizontal fin assembly 102 comprises five horizontal fin members 102a. The horizontal fin members 102a comprise a swinging shaft 102b and a receiving shaft 102c. The receiving shafts 102c of the respective horizontal fin members 102 are connected with each other by the connecting rod 103. Hence, each of the horizontal fin members 102a swings about each of the swinging shafts 102b.

In the conventional air-conditioning register 100, it is necessary to secure a space "S" for swinging the lowest horizontal member 102a therein when directing the air-conditioning air upward, specifically when directing the horizontal fin assembly 102 upward. Namely, the lowest horizontal fin member 102a does not contribute much to the direction adjustment of the air-conditioning air. However, the respective horizontal fin members 102a are connected with each other by the connecting rod 103. Accordingly, the lowest horizontal fin member 102a should swing with the other horizontal fin members 102a while interlocking with them. Therefore, the space "S" should be secured in order to let the lowest horizontal fin member 102a swing therein.

The space "S" is one of the causes of noises, such as whistling sounds, generating from the outlet port 104. Moreover, securing the space "S" should inevitably result in providing a wide distance between the lower periphery of the outlet port 104 and a vertical-fin operation dial 105. Consequently, the conventional air-conditioning register 100 looks dull decoratively, and gives poor appearance.

In view of the disadvantages, Japanese Unexamined Patent Publication (KOKAI) No. 11-139,156 and Japanese Unexamined Patent Publication (KOKAI) No. 11-180,140 disclose an air-conditioning register in which a receiver of the lowest horizontal fin member is fitted into a recess groove bored through the connecting rod. In the air-conditioning register set forth in both publications, the receiver swings relatively in the recess groove when directing the air-conditioning air upward. Accordingly, it is possible to keep the lowest horizontal fin member substantially horizontally independently of the other horizontal fin members. Consequently, it is possible to obviate the space "S" shown in FIG. 6.

In the air-conditioning register disclosed in the publications, the receiver can reciprocate in the recess groove in the longitudinal direction thereof. Accordingly, the air-conditioning air flow might rattle the lowest horizontal fin member. Moreover, in the case of air-conditioning registers in which the lowest horizontal fin member is controlled by the sliding between the receiver and the recess groove alone, the receiver might not slide well in the recess groove because of the inaccurately molded component parts.

SUMMARY OF THE INVENTION

The present invention has been developed and completed in view of such circumstances. It is therefore an object of the present invention to provide a register for air conditioning whose fin members are less likely to rattle and are controlled with high accuracy.

A register for air conditioning according to the present invention can solve the aforementioned problems, and comprises:

a cylinder-shaped retainer having opposite inner surfaces;

a fin assembly comprising a plurality of fin members disposed in the retainer, wherein at least one of paired fin members, which are disposed in proximity to the opposite inner surfaces of the retainer, swings by a swing angle smaller than that of all of the other fin members, and functions as a dummy fin member keeping a constant angle independently within a predetermined swing-angle range where all of the other fin members swing;

a first connector connecting the fin members;

a second connector connecting the dummy fin member and all of the other fin members while absorbing a swing-angle difference between the dummy fin member and all of the other fin members; and a guide guiding the second connector on a predetermined track.

The present air-conditioning register controls the dummy fin member with the second connector and guide in addition to the first connector. Accordingly, the dummy fin member is less likely to rattle. Moreover, it is possible to reliably control the dummy fin member. In addition, it is unnecessary to provide such a space "S" as shown in FIG. 6.

Moreover, the present air-conditioning register can preferably be arranged so that the fin members comprise a swinging shaft functioning as the swinging center in operation, and a receiver receiving an operation force; the first connector comprises a plurality of holders rotatably holding the receiver of the fin members; and one of the holders, rotatably holding the receiver of the dummy fin member, comprises a sliding allowance for making it possible to absorb the swing-angle difference between the dummy fin member and all of the other fin members, and functions as a sliding holder slidably contacting with the receiver of the dummy fin member. With this arrangement, it is possible to connect the first connector with the fin members by a relatively simplified construction while allowing the movement difference between the dummy fin member and all of the other fin members.

In addition, a further aspect of the present air-conditioning register can also solve the aforementioned problems, and comprises:

a cylinder-shaped retainer in which air-conditioning air flows and which has opposite inner surfaces;

a damper held rotatably the retainer, and being capable of switching between a close position for shutting off the flow of the air-conditioning air and an open position for allowing the flow of the air-conditioning air; and a fin assembly comprising a plurality of fin members held rotatably in the retainer and adjusting the blowing direction of the air-conditioning air;

the fin members comprising paired fin members disposed in proximity to the opposite inner surfaces of the retainer, at least one of the paired fin members being free from interlocking with all of the other fin members and functioning as a damper-interlocking fin member interlocking with the damper to interlock with all of the other fin members in a simulating manner when the damper is switched from the open position to the close position or vice versa.

In accordance with the further aspect of the present air-conditioning register, the damper-interlocking fin member is less likely to rattle because the damper-interlocking fin member is not connected with all of the other fin members. Further, it is possible to reliably control the damper-interlocking fin member. Furthermore, it is unnecessary to provide such a space "S" as shown in FIG. 6. Moreover, the further aspect of the present air-conditioning register is constructed simply, because no mechanism for absorbing the swing-angle difference between the damper-interlocking fin member and all of the other fin members is not required. In addition, it is easy for an operator to visually confirm whether the damper shuts off the flow of the air-conditioning air by the state of the damper-interlocking fin member and all of the other fin members at the close position, because the damper-interlocking fin member interlocks with all of the other fin members in a simulating manner. Still further, the damper-interlocking fin member is less likely to inhibit the flow of the air-conditioning air at the open position.

The present air-conditioning register can make the dummy fin member and damper-interlocking fin member less likely to rattle. Moreover, it can control the dummy fin member and damper-interlocking fin member reliably.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIGS. 2a, 2b and 2c are drawings for illustrating a link mechanism for the air-conditioning register according to Example No. 1.

EXAMPLES

Having generally described the present invention, a further understanding can be obtained by reference to the specific preferred embodiments which are provided herein for the purpose of illustration only and not intended to limit the scope of the appended claims. Hereinafter, the present invention will be described with reference to forms of embodying the present air-conditioning register applied to vehicles.

Example No. 1

Figure 1:
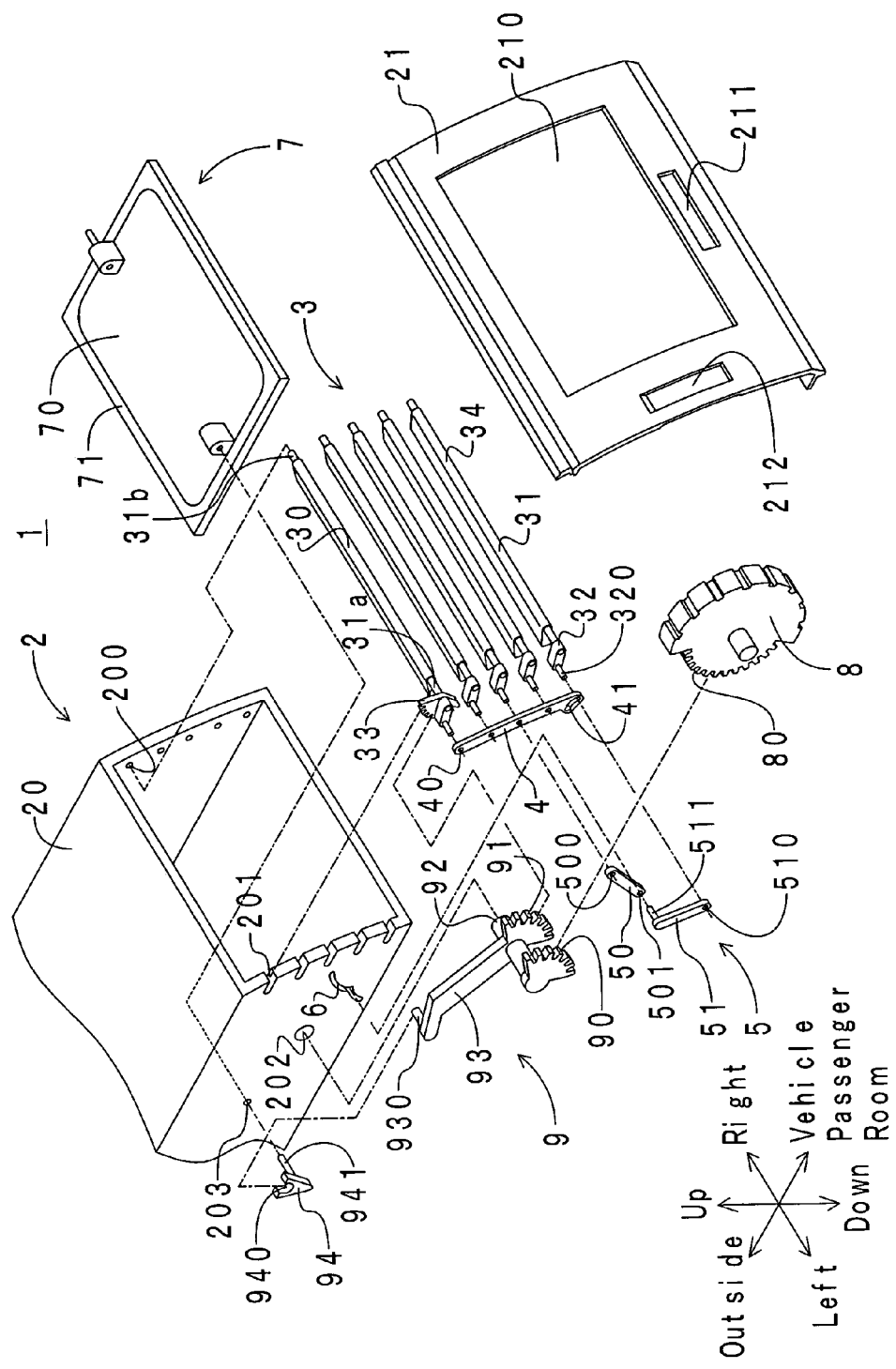
FIG. 1 is an exploded view of an air-conditioning register according to Example No. 1 of the present invention.

First, the arrangement of an air-conditioning register according to Example No. 1 of the present invention will be hereinafter described in detail. FIG. 1 illustrates an exploded view of the air-conditioning register according to Example No. 1. As illustrated in the drawing, an air-conditioning register 1 comprises a nozzle, or retainer 2, a horizontal fin assembly 3, a connecting rod 4, a joint arm 5, a guide groove 6, a damper 7, a horizontal-fin operation dial 8, and a gear assembly 9. Note that the present fin assembly includes the horizontal fin assembly 3; the present first connector includes the connecting rod 4; the present second connector includes the joint arm 5; and the present guide includes the guide groove 6.

The retainer 2 comprises a retainer body 20, and a bezel 21. The retainer body 20 is made of resin, and is formed as a squared-cylinder shape. The retainer body 20 is connected with an air-conditioning duct (not shown) at the outer end with respect to a vehicle passenger room. Air-conditioning air is supplied into the retainer body 20 through the air-conditioning duct. Fin swinging holes 200 are bored through at the inner end of the right wall of the retainer body 20 with respect to the vehicle passenger room. On the other hand, fin swinging grooves 201 are formed as a cut-off shape in the left wall of the retainer body 20. Moreover, the guide groove 6 is dented as a double-arc shape in the left wall of the retainer body 20. In addition, a gear-assembly swinging hole 202 and a damper swinging hole 203 are bored through the left wall of the retainer body 20 on the outer side of the guide groove 6 with respect to the vehicle passenger room. The bezel 21 is made of resin, and is formed as a rectangle shape. The bezel 21 is disposed flush with an instrument panel (not shown) substantially. An outlet port 210 is opened in the middle of the bezel 21. Moreover, a vertical-fin operation opening 211 is opened under the outlet port 210. In addition, a horizontal-fin operation opening 212 is opened on the left side of the outlet port 210.

The horizontal fin assembly 3 comprises four horizontal fin members 30, and a dummy fin member 34. The present fin members include the horizontal fin members 30 and dummy fin member 34. The fin members are disposed vertically. Note that the dummy fin member 34 is disposed lowest at the bottom. The horizontal fin members 30 and dummy fin member 34 comprise a fin body 31, and a connecting tab 32. The fin body 31 is made of resin, and is formed as a fine plate shape extending horizontally. Swinging shafts 31a, 31b project from the left and right opposite ends of the fin body 31. The trunk of the swinging shafts 31a is accommodated in the fin swinging groove 201. The swinging shafts 31b are fitted into the fin swinging holes 200. Accordingly, the fin bodies 31 can swing about the swinging shafts 31a, 31b. The connecting tab 32 is made of resin, and is formed as a rectangular parallelepiped shape. The connecting tab 32 is fastened to the leading end of the swinging shafts 31a. Consequently, the connecting tabs 32 can also swing together with the fin bodies 31. A receiving shaft 320 projects from the left side surface of the connecting tabs 32 in the drawing. The present receiver includes the receiving shafts 320. Moreover, a fin-side gear 33, which is made of resin and is formed as a sector shape, is fastened to the trunk of the swinging shaft 31a of the fin body 31 of the uppermost horizontal fin member 30.

The connecting rod 4 is made of resin, and is formed as a fine plate shape extending vertically. In the connecting rod 4, there are formed four holder holes 40 and a swinging holder groove 41. The present holder includes the holder holes 40 and swinging holder groove 41. The swinging holder groove 41 is formed as an arc shape. The receiving shaft 320 of the dummy fin member 34 is fitted into the swinging holder groove 41. In addition, the receiving shaft 320 of the horizontal fin members 30 is fitted into each of the holder holes 40.

The joint arm 5 comprises an upper arm 50, and a lower arm 51. The upper arm 50 and the lower arm 51 are joined to form a linkage. Both upper arm 50 and lower arm 51 are made of resin, and are formed as a fine plate shape. A dummy-fin-member link hole 510 is bored through the lower arm 51 at the inner end with respect to the vehicle passenger room. The receiving shaft 320 of the dummy fin member 34, which has penetrated through the swinging holder groove 41, is fitted into the dummy-fin-member link hole 510. A guided projection 511 projects from the outer end of the lower arm 50 with respect to the vehicle passenger room. Moreover, a horizontal-fin-member link hole 500 is bored through at the inner end of the upper arm 50 with respect to the vehicle passenger room. The receiving shaft 320 of one of the horizontal fin members 30, e.g., the third one from the top, which has penetrated through the holder hole 40, is fitted into the horizontal-fin-member link hole 500. A joint hole 501 is bored through at the outer end of the upper arm 50 with respect to the vehicle passenger room. The guided projection 511 is fitted into the guide groove 6 after it penetrates through the joint hole 501. Therefore, the joint arm 5 can bend about the guided projection 511. Moreover, the double-arc-shaped groove 6 regulates the locus of the joint arm 5.

The gear assembly 9 is made of resin, and is formed as a fine plate shape as a whole. A first gear 90 and a second gear 91 are disposed parallely at the inner end of the gear assembly 9 with respect to the vehicle passenger room. The second gear 91 meshes with the fin-side gear 33. A gear swinging shaft 92 projects from the arc center of the first gear 90 and second gear 91. The gear swinging shaft 92 is fitted into the gear swinging hole 202 of the retainer body 20. Thus, the gear assembly 9 can swing about the gear swinging shaft 92. A damper driving arm 93 projects from the outer end of the second gear 91 with respect to the vehicle passenger room. Moreover, a damper driving shaft 930 projects from the leading end of the damper driving arm 93 on the right side surface of the damper driving arm 93 in the drawing. Note that the damper driving shaft 930 can engage with a dent 940 of the damper driving tab 94. In addition, the damper driving tab 94 further comprises a damper swinging shaft 941 which is fitted into the damper swinging hole 203 of the retainer body 20.

The horizontal-fin operation dial 8 is made of resin, and is formed as a disk shape. The horizontal-fin operation dial 8 is held rotatably on the rear-surface side of the instrument panel, with a part of which is projected into the vehicle passenger room through the horizontal-fin operation opening 212. A dial gear 80 is formed on the periphery of the horizontal-fin operation dial 8 partially. The dial gear 80 meshes with the first gear 90 of the gear assembly 9.

The damper 7 comprises a damper body 70, and a sealing frame 71. The damper body 70 is made of resin, and is formed as a rectangle shape. The damper body 70 is fastened to the leading end of the damper swinging shaft 941 of the damper driving tab 94. Therefore, the damper 7 can swing about the damper swinging shaft 941. The sealing frame 71 is made of rubber, and is fitted around the outer periphery of the damper body 70.

A vertical fin assembly (not shown) is disposed between the horizontal fin assembly 3 and the damper 7. Moreover, a vertical-fin operation dial (not shown) is disposed in the vertical-fin operation opening 211.

The operations of the air-conditioning register 1 according to Example No. 1 will be hereinafter described. The operation force is transmitted from an operator to the uppermost horizontal fin member 30 by way of the dial gear 80, the first gear 90, the second gear 91 and the fin-side gear 33 in this order. Then, the operation force is transmitted to the other horizontal fin members 30 as well as the dummy fin member 34 by way of the connecting rod 4.

FIGS. 2*a*, 2*b* and 2*c* illustrate a link mechanism for the air-conditioning register 1 according to Example No. 1. FIG. 2*a* shows the close position, e.g., a position at which the damper 7 shuts off the flow of the air-conditioning air and the horizontal fin assembly 3 covers the outlet port 210. FIG. 2*b* shows a position for blowing the air-conditioning air substantially horizontally. FIG. 2*c* shows a position for blowing the air-conditioning air upward. At the close position, the horizontal fin assembly 3 is disposed flush with the bezel 21 substantially. When switching the close position to the position for blowing the air-conditioning air substantially horizontally, the horizontal fin members 30 and dummy fin member 34 which are connected by the connecting rod 4 move all together in the direction of the arrows "a" of FIG. 2*a*. Moreover, the guided projection 511 slides in the major arc 60 of the guide groove 6 in the direction of the arrow "b" of the drawing. On the other hand, when switching the position for blowing the air-conditioning air substantially horizontally to the close position, the component parts interlock with each other in the opposite directions with respect to the above-described directions.

When switching the position for blowing the air-conditioning air substantially horizontally to the position for blowing the air-conditioning air upward, the horizontal fin members 30 further move in the direction of the arrows "c" of FIG. 2*b*. However, the dummy fin member 34 keeps the substantially horizontal disposition. It is because the receiving shaft 320 of the dummy fin member 34 slides in the swinging holder groove 41 of the connecting rod 4 relatively to the connecting rod 4. In other words, the connecting rod 4 moves downward, but the dummy fin member 34 is stationary. As a result, the receiving shaft 320 of the dummy fin member 34 is displaced from the bottom end of the swinging holder groove 41 to the top end. Namely, the swinging holder groove 41 of the connector rod 4 absorbs the displacement of the connecting rod 4 accompanied by the swinging horizontal fin members 30. Moreover, it results from the arrangement that the swinging force is hardly applied to the dummy fin member 34, because the curvature center of the minor arc 61 of the guide groove 6 coincides with the receiving shaft 320 of the dummy fin member 34, though the guided projection 511 slides in the minor arc 61 in the direction of the arrow "d" of FIG. 2*b*. In addition, the joint arm 5 moves while bending about the guided projection 511, and thereby absorbs the swing-angle difference between the horizontal fin members 30 and the dummy fin member 34. When switching the position for blowing the air-conditioning air upward to the position for blowing the air-conditioning air substantially horizontally, the component parts interlock with each other in the opposite directions with respect to the above-described directions.

Next, the advantages effected by the air-conditioning register 1 according to Example No. 1 will be described. The air-conditioning register 1 according to Example No. 1 controls the dummy fin member 34 by the joint arm 5 and guide groove 6 in addition to the connecting rod 4. Accordingly, the dummy fin member 34 is less likely to rattle.

Figure 6:
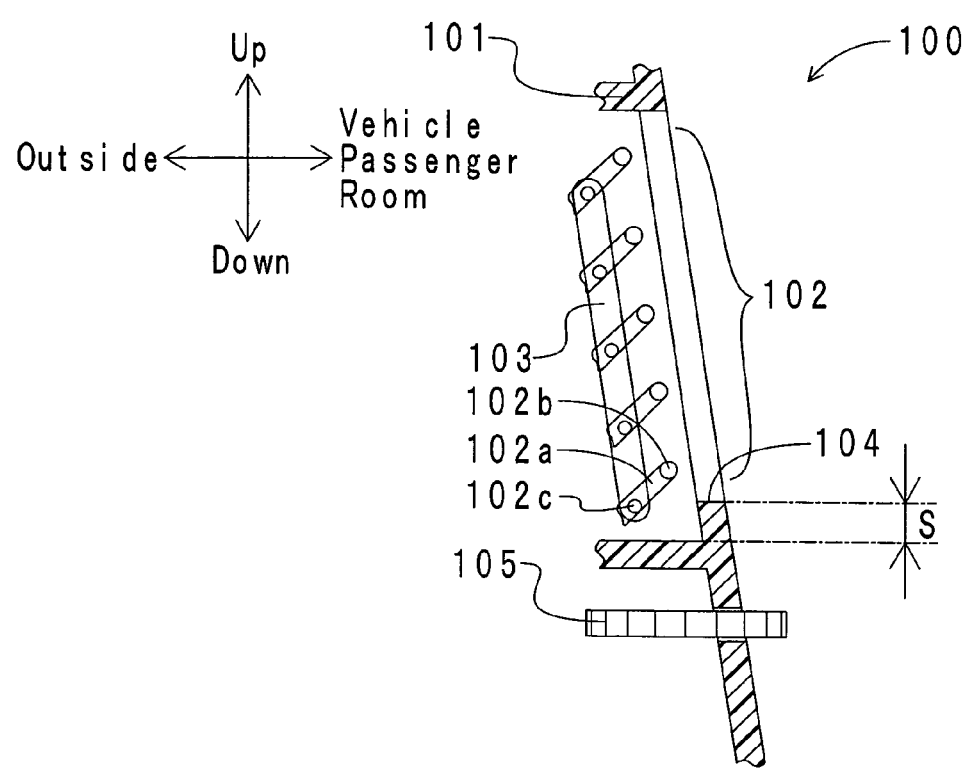
FIG. 6 is a drawing for illustrating the link mechanism for the conventional air-conditioning register.

Further, it is possible to reliably control the dummy fin member 34 by the connecting rod 4, joint arm 5 and guide groove 6. Furthermore, it is unnecessary to secure such a space as the space "S" shown in FIG. 6. Consequently, noises like whistling sounds are less likely to occur. Moreover, as illustrated in FIG. 1, it is possible to dispose the lower periphery of the outlet port 210 close to the vertical-fin operation opening 211. Therefore, the air-conditioning register 1 gives good appearance.

In addition, in the air-conditioning register 1 according to Example No. 1, the swinging holder groove 41 is formed in the connecting rod 4. Accordingly, regardless of the relatively simplified construction, it is possible to connect the connecting rod 4 with the dummy fin member 34 and other horizontal fin members 30 while allowing the movement difference between them.

Example No. 2

Figure 3A:
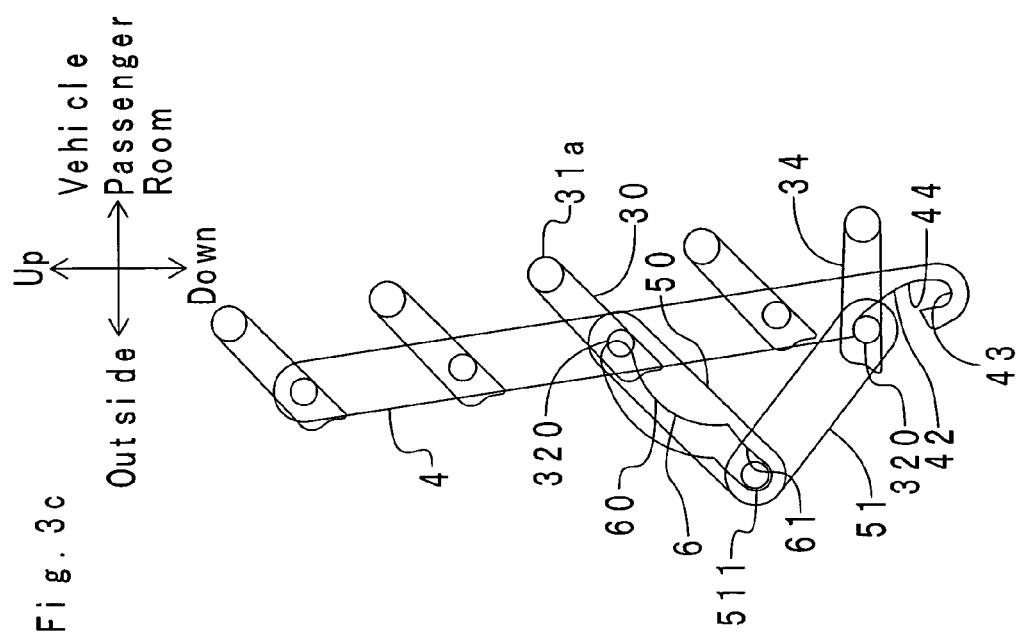
FIGS. 3a, 3b and 3c are drawings for illustrating a link mechanism for an air-conditioning register according to Example No. 2 of the present invention.
Figure 3B:
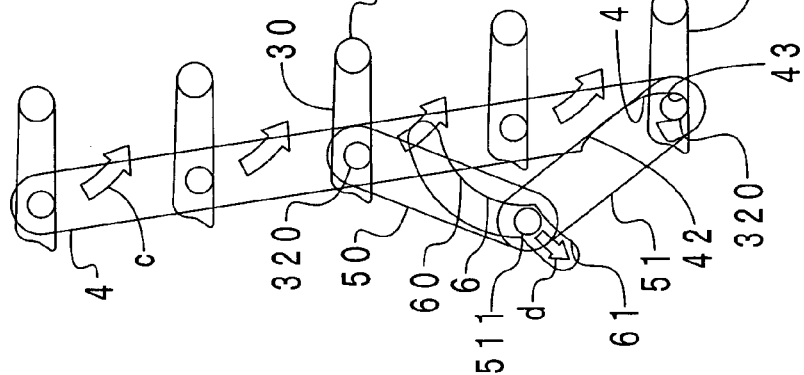
Figure 3C:
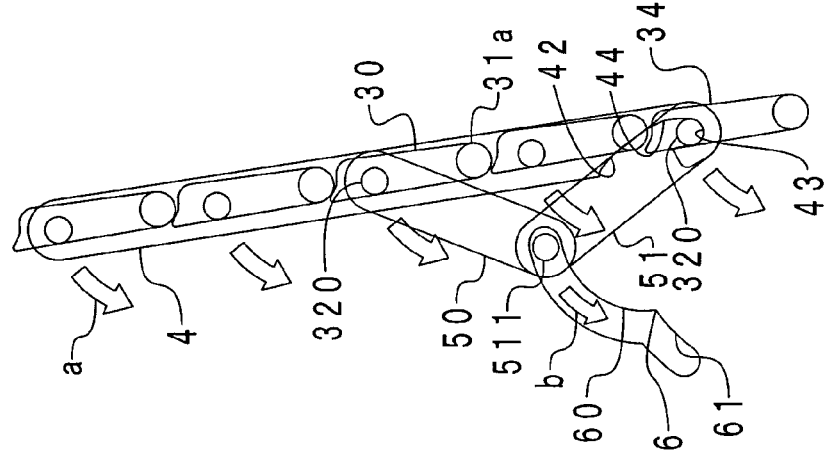

An air-conditioning register 1 according to Example No. 2 of the present invention differs from the air-conditioning register 1 according to Example No. 1 in that a swinging holder opening is disposed in the connecting rod instead of the swinging holder groove. Therefore, only the difference will be hereinafter described. FIGS. 3a, 3b and 3c illustrate a link mechanism for the air-conditioning register 1 according to Example No. 2. In FIGS. 3a, 3b and 3c, note that parts like those of FIGS. 2a, 2b and 2c are designated at the same reference numerals.

As illustrated in the drawing, a "C"-shaped swinging holder opening 42 is formed at the lower end of the connecting rod 4, instead of the swinging holder groove 41. When the swing angle of the dummy fin member 34 falls in a range of from the close position to the position for blowing the air-conditioning air substantially horizontally, the receiving shaft 320 of the dummy fin member 34 is held at a turnover portion 43 of the swinging holder opening 42. On the other hand, when the swing angle of the dummy fin member 34 falls in a range of from the position for blowing the air-conditioning air substantially horizontally to the position for blowing the air-conditioning air upward, the receiving shaft 320 of the dummy fin member 34 moves in the swinging holder opening 42 relatively to the connecting rod 4 while being regulated by an upper arc-shaped peripheral portion 44 of the swinging holder opening 42. In other words, the connector rod 4 moves downward, but the dummy fin member 34 is stationary. As a result, the receiving shaft 320 of the dummy fin member 34 is displaced from the turnover portion 43 of the swinging holder opening 42 to the upper arc-shaped peripheral portion 44.

The air-conditioning register 1 according to Example No. 2 effects advantages in the same manner as the air-conditioning register 1 according to Example No. 1. Moreover, in the air-conditioning register 1 according to Example No. 2, the swinging holder opening 42 can regulate the receiving shaft 320 over the entire travel distance without daring to form an endless swinging holder groove. Therefore, the structure of the connecting rod 4 can be simplified. Moreover, the connecting rod 4 can be molded and assembled with ease.

Example No. 3

An air-conditioning register 1 according to Example No. 3 of the present invention differs from the air-conditioning register 1 according to Example No. 1 in that the connecting rod connects the horizontal fin members only; and moreover in that a damper-interlocking fin member is disposed instead of the dummy fin member. Therefore, only the differences will be hereinafter described.

Figure 4:
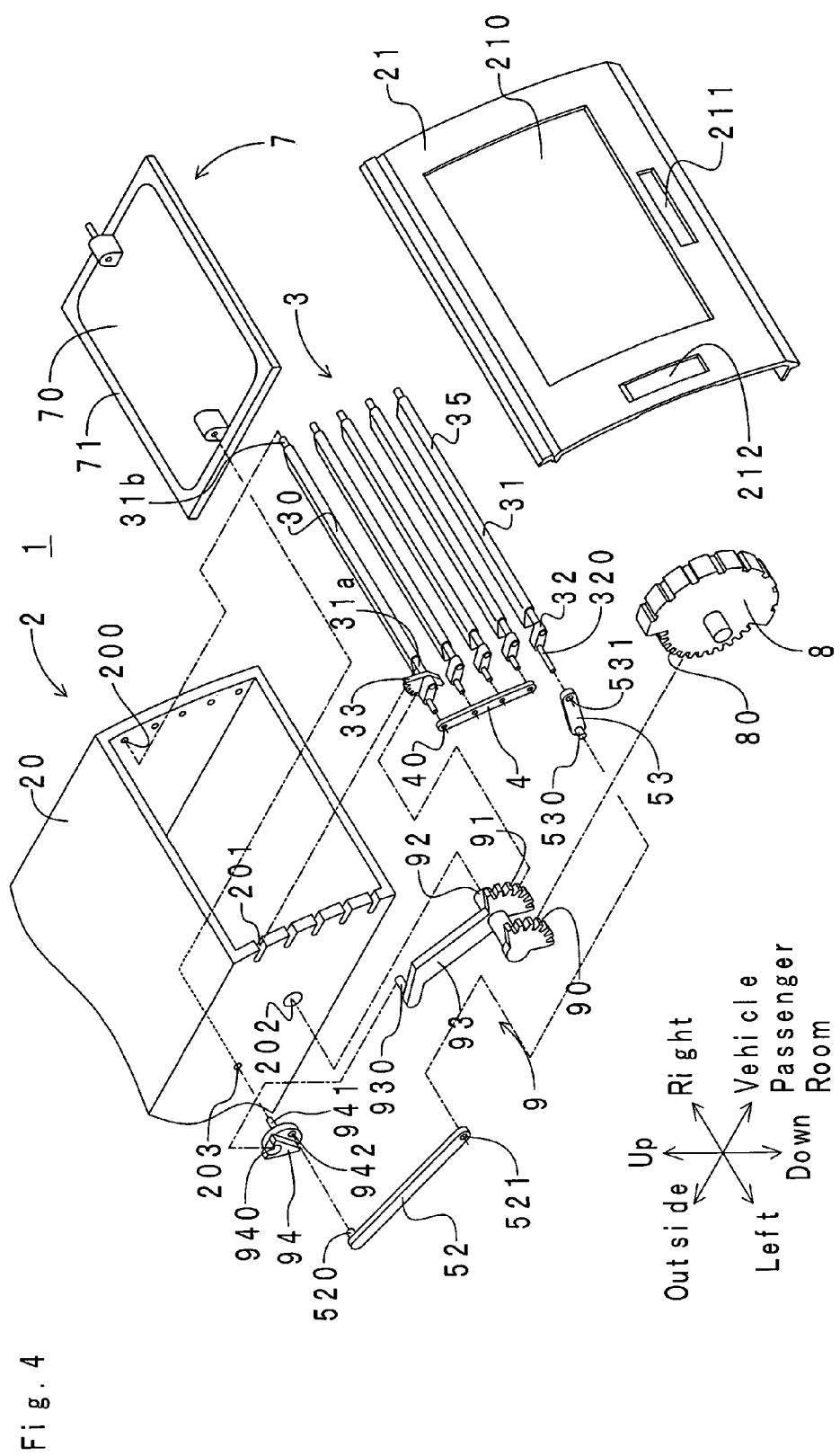
FIG. 4 is an exploded view of an air-conditioning register according to Example No. 3 of the present invention.

FIG. 4 illustrates an exploded view of an air-conditioning register 1 according to Example No. 3 of the present invention. In FIG. 4, note that parts like those of FIG. 1 are designated at the same reference numerals. As illustrated in the drawing, an air-conditioning register 1 according to Example No. 3 comprises a long arm 52, and a short arm 53. The long arm 52 is made of resin, and is formed as a fine plate shape. A long-arm-side connector projection 520 projects from the long arm 52 at the outer end with respect to the vehicle passenger room. The long-arm-side connector projection 520 is fitted into a driving-tab-side connector hole 942 which is bored through a damper driving tab 94. A long-arm-side connector hole 521 is bored through the longer arm 52 at the inner end with respect to the vehicle passenger room. The short arm 53 is made of resin, and is formed as a fine plate shape shorter than the long arm 52. A short-arm-side connector projection 530 projects from the short arm 53 at the outer end with respect to the vehicle passenger room. The short-arm-side connector projection 530 is fitted into the long-arm-side connector hole 521. A short-arm-side connector hole 531 is bored through the short arm 53 at the inner end with respect to the vehicle passenger room. A receiving shaft 320 of a damper-interlocking fin member 35 is fitted into and fastened to the short-arm-side connector hole 531.

Figure 5A:
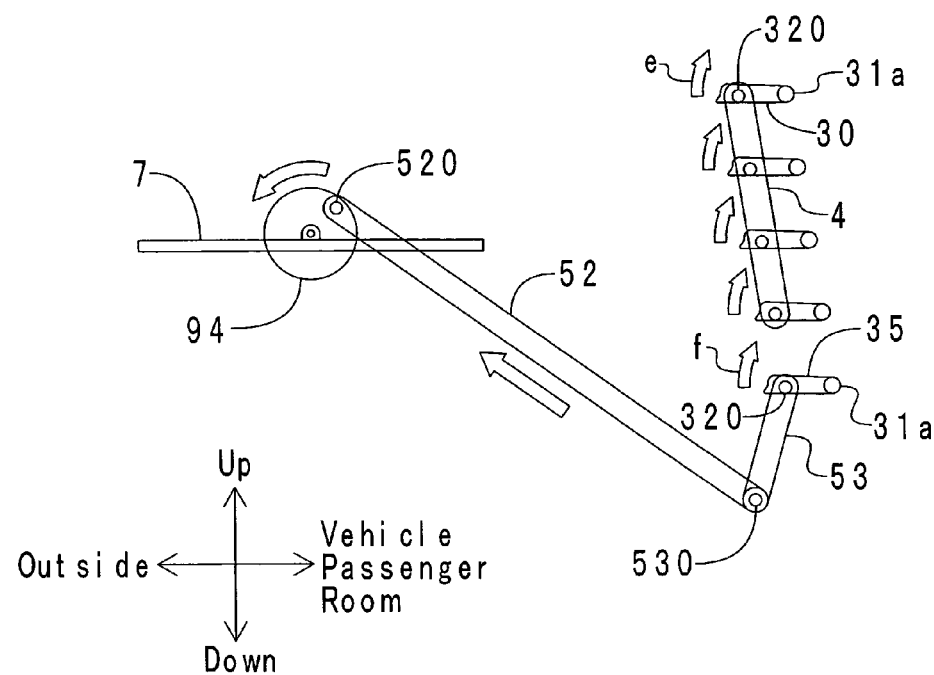
FIGS. 5a and 5b are drawings for illustrating a link mechanism for the air-conditioning register according to Example No. 3.
Figure 5B:
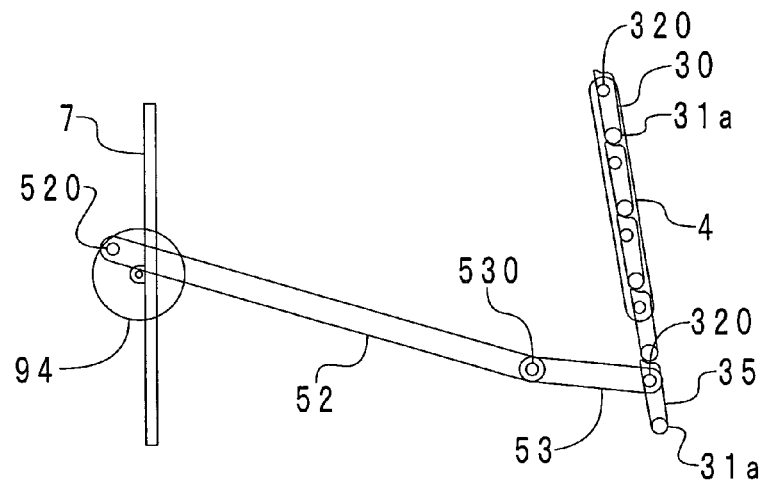

FIGS. 5a and 5b illustrate a link mechanism for the air-conditioning register 1 according to Example No. 3. FIG. 5a shows a position for blowing the air-conditioning air substantially horizontally. FIG. 5b shows the close position. Note that only the four horizontal fin members 30 connected by the connecting rod 4 are operable at the open position, e.g., a position at which the flow of the air-conditioning air is allowed, and which includes the position for blowing the air-conditioning air substantially horizontally. In this instance, the damper-interlocking fin member 35 is kept substantially horizontally. When switching the open position to the close position, the operation force is transmitted from an operator to the uppermost horizontal fin member 30 by way of the dial gear 80, the first gear 90, the second gear 91 and the fin-side gear 33 (see FIG. 4) in this order. Then, the operation force is transmitted to the other three horizontal fin members 30 by way of the connecting rod 4. Accordingly, the four horizontal fin members 30 swing all together in the direction of the arrows "e" of FIG. 5a.

Additionally, the operation force is transmitted from the operator to the damper-interlocking fin member 35 by way of the dial gear 80, the first gear 90, the damper driving shaft 930, the damper driving tab 94, the long arm 52 and the short arm 53 (see FIG. 4) in this order. Consequently, the damper-interlocking fin member 35 swings in the direction of the arrow "f" of FIG. 5a. Then, the four horizontal fin members 30 and the damper-interlocking fin member 35 covers the outlet port 210 cooperatively. When switching the close position to the open position, the component parts interlock with each other in the opposite directions with respect to the above-described directions.

In the air-conditioning register 1 according to Example No. 3, the damper-interlocking fin member 35 is not connected with the horizontal fin members 30. Therefore, the damper-interlocking fin member 35 is less likely to rattle. Additionally, the damper-interlocking fin member 35 can be controlled reliably. Further, it is unnecessary to secure such a space as the space "S" shown in FIG. 6. Furthermore, it is possible to obviate such a mechanism for absorbing the swing-angle difference between the damper-interlocking fin member 35 and the horizontal fin members 30. Thus, the structure of the air-conditioning register 1 according to Example No. 3 is simplified. Moreover, the damper-interlocking fin member 35 interlocks with the other horizontal fin members 30 in a simulating manner. Accordingly, an operator can visually confirm with ease whether the damper 7 shuts off the flow of the air-conditioning air by the state of the damper-interlocking fin member 35 and the horizontal fin members 30 at the close position. In addition, the damper-interlocking fin member 35 is disposed horizontally to the inner surface of the retainer body 20 at the open position. Consequently, the damper-interlocking fin member 35 is less likely to inhibit the flow of the air-conditioning air at the open position.

Modified Versions

Heretofore, a few of the embodiment modes of the present air-conditioning register are described. However, the embodiment modes are not limited to the above-described embodiment modes particularly. It is possible to perform the present air-conditioning register in various modified embodiment modes or improved embodiment modes which one of ordinary skill in the art can carry out.

For example, in the above-described examples, the lowermost fin member functions as the dummy fin member 34 or the damper-interlocking fin member 35. However, the uppermost fin member can function as the dummy fin member 34 or the damper-interlocking fin member 35. Further, the uppermost and lowermost fin members can function as the dummy fin member 34 or the damper-interlocking fin member 35. Furthermore, in the examples, the dummy fin member 34 or the damper-interlocking fin member 35 is disposed in the horizontal fin assembly 3. However, the dummy fin member 34 or the damper-interlocking fin member 35 can be disposed in the vertical fin assembly. Moreover, it is possible to embody the present air-conditioning register as air-conditioning registers whose vertical fin dial is not disposed under the outlet port 210. In addition, it is possible as well to embody the present air-conditioning register as air-conditioning registers for household indoor air conditioners, not limited to those for vehicle air conditioners.

Having now fully described the present invention, it will be apparent to one of ordinary skill in the art that many changes and modifications can be made thereto without departing from the spirit or scope of the present invention as set forth herein including the appended claims.

What is claimed is:

1. A register for air conditioning, comprising:
a cylinder-shaped retainer having opposite inner surfaces;
a fin assembly comprising a plurality of fin members disposed in the retainer, wherein at least one fin member, which is disposed in proximity to the opposite inner surfaces of the retainer, swings by a swing angle smaller than that of all of the other fin members and functions as a dummy fin member keeping a constant angle independently within a predetermined swing-angle range when all of the other fin members swing;
a first connector connecting the fin members;
a second connector connecting the dummy fin member and all of the other fin members while absorbing a swing-angle difference between the dummy fin member and all of the other fin members; and
a guide guiding the second connector on a predetermined track.

2. The register set forth in claim 1, wherein:
the fin members comprise a swinging shaft functioning as the swinging center in operation, and a receiver receiving an operation force;
the first connector comprises a plurality of holders rotatably holding the receiver of the fin members; and
one of the holders, rotatably holding the receiver of the dummy fin member, comprises a sliding allowance for making it possible to absorb the swing-angle difference between the dummy fin member and all of the other fin members, and functions as a sliding holder slidably contacting with the receiver of the dummy fin member.

3. The register set forth in claim 2, wherein the sliding holder is a swinging holder groove bored therethrough, the swinging holder groove slidably contacting with the receiver of the dummy fin member.

4. The register set forth in claim 2, wherein the sliding holder is a "C"-shaped swinging holder opening cut off at the lower end, the swinging holder opening slidably contacting with the receiver of the dummy fin member and comprising a turnover portion disposed at the bottom and a curvature disposed at the top end over the turnover portion.

5. The register set forth in claim 1, wherein the second connector comprises a first arm rotatably holding all of the other fin members, and a second arm rotatably holding the dummy fin member, and a joint connecting the first arm bendably to the second arm and guided by the guide.

6. The register set forth in claim 1, wherein the guide is formed as a double-arc shape comprising a first arc having a first circumferential length, and a second arc having a second circumferential length shorter than the first circumferential length.

7. A register for directing air conditioning air flow, wherein the register comprises:
an air nozzle having opposed inner surfaces;
a fin assembly comprising a plurality of pivoting fin members supported near an outlet of the nozzle, wherein at least a first fin member is limited to a pivot angle that is smaller than that of all of the other fin members and maintains a constant angle, independently of the other fin members, within a predetermined pivot angle range, when all of the other fin members are pivoted;
a connecting rod that connects the fin members to one another;
a linkage that connects the first fin member to all of the other fin members while permitting a pivot angle difference between the first fin member and all of the other fin members; and
a guide that guides the linkage such that motion of the linkage is limited to a predetermined range of motion.

8. The register set forth in claim 7, wherein to the first fin member is the lowest of the fin members.

9. The register set forth in claim 7, wherein the linkage includes an upper arm and a lower arm, and the upper arm has two opposed ends, and the one end of the upper arm is pivotally connected to the lower arm, and the other end of the upper arm is pivotally connected to the connecting rod, and the lower arm has two opposed ends, and one end of the lower arm is pivotally connected to the upper arm, and the other end of the lower arm is pivotally connected to the first fin member, such that the linkage regulates motion of the first fin member.

* * * * *

UNITED STATES PATENT AND TRADEMARK OFFICE
CERTIFICATE OF CORRECTION

PATENT NO.          : 7,018,288 B2
APPLICATION NO. : 10/889045
DATED                  : March 28, 2006
INVENTOR(S)       : Makoto Okada et al.

Page 1 of 1

It is certified that error appears in the above-identified patent and that said Letters Patent is hereby corrected as shown below:

Title Page;

Inventors

Correct item (75) of original Letters Patent to read as:

Makoto Okada, Aichi-ken (JP);
    Mitsuo Ogura, Aichi-ken (JP);
    Kenji Asano, Aichi (JP);
    Junichiro Kako, Aichi-ken (JP);
    Kazutomo Kajiwara, Aichi-ken (JP)

Signed and Sealed this

Seventeenth Day of June, 2008

JON W. DUDAS
*Director of the United States Patent and Trademark Office*